United States Patent [19]
Vorwerck et al.

[11] Patent Number: 5,427,810
[45] Date of Patent: Jun. 27, 1995

[54] METHOD FOR HYDROTHERMAL TREATMENT OF STARCH PRODUCTS, PARTICULARLY RICE

[75] Inventors: Karldietrich Vorwerck, Wolfenbüttel; Uwe Brandt, Braunschweig, both of Germany

[73] Assignee: Bühler GmbH, Braunschweig, Germany

[21] Appl. No.: 135,363

[22] Filed: Oct. 12, 1993

Related U.S. Application Data

[63] Continuation of Ser. No. 896,491, Jun. 2, 1992, abandoned, which is a continuation of Ser. No. 660,712, Feb. 22, 1991, abandoned.

[30] Foreign Application Priority Data

Mar. 22, 1990 [DE] Germany .......... 40 09 157.0

[51] Int. Cl.$^6$ .................................. A23L 1/182
[52] U.S. Cl. .................................. 426/459; 426/460; 426/461; 426/476; 426/510; 426/511; 426/618; 426/636
[58] Field of Search .......... 426/459, 460, 476, 510, 426/511, 618, 636, 461

[56] References Cited

U.S. PATENT DOCUMENTS

| | | | |
|---|---|---|---|
| 1,185,622 | 6/1916 | Boss | 426/511 |
| 1,231,143 | 6/1917 | Engstad | 426/511 |
| 2,592,407 | 4/1952 | Fernandes | 426/311 |
| 3,086,867 | 4/1963 | Miller | 426/450 |
| 4,857,348 | 8/1989 | Abraham et al. | 426/462 |

FOREIGN PATENT DOCUMENTS

| | | |
|---|---|---|
| 179206 | 5/1922 | United Kingdom . |
| 722333 | 1/1955 | United Kingdom . |
| 781062 | 8/1957 | United Kingdom . |
| 807084 | 1/1959 | United Kingdom . |

*Primary Examiner*—Helen Pratt
*Attorney, Agent, or Firm*—Martin A. Farber

[57] ABSTRACT

Parboiled rice, or a similar starch-containing product, is produced by moistening the rice in a preheating installation 1 and, thereafter, applying steam to heat the rice to boiling temperature. The rice is kept at the boiling temperature in a heat-retaining vessel 9 for cooking rice. Thereupon, the rice is dried in a drying installation 12 and cooled, if necessary.

19 Claims, 3 Drawing Sheets

METHOD FOR HYDROTHERMAL TREATMENT OF STARCH PRODUCTS, PARTICULARLY RICE

RELATED APPLICATION

This application is a continuation of our co-pending application Serial No.: 07/896,491 filed: Jun. 2, 1992, now abandoned, which in turn is a continuation of our application Serial No. 07/660,712 (now abandoned) filed Feb. 22, 1991.

FIELD OF THE INVENTION

The invention relates to a method and an apparatus for precooking starchy products, particularly rice, with the moisted product first being cooked by supply of heat energy, whereupon it is dried as well as cooled, if necessary.

BACKGROUND OF THE INVENTION

It is already known to subject rice to hydro-thermical treatment, i.e, a treatment under the influence of moisture and heat and to market a type of rice treated in such a way as parboiled rice, in which type the cooking time is considerably reduced. Other starchy products can also be subjected to such a hydrothermical treatment for the same purpose.

It has already been suggested to soak the rice in water, to cook it after that and then to remove the grains of rice from the cooking water and to dry them. It is true that for such a process simple and cheap installations are sufficient, but such a method requires a great expenditure of energy, is very time-consuming and can only be used for treatment of rice in batch quantities. Such a process does not lend itself to industrial use, though.

Further, it is also already known to carry out the cooking process in a pressure vessel (GB-A-722 333, GB-A 781 062, GB-A 807 084). It is true that in doing so the cooking process is accelerated, but the machinery required for this is relatively expensive and its operation requires—if only because of legal regulations—an especially trained operating staff. With this known procedure, the expenditure of energy is relatively great as well and furthermore this method allows only a treatment of the rice in batch quantities.

Also it has already been proposed to treat the rice with water and steam simultaneously (US-A 2 592 407, US-A 3 086 867). In this case, the treatment generally consists of a multi-stage process, which requires even greater expenses for equipment and involves a greater expenditure of energy.

From the GB-A 179 206 a method and an apparatus for the production of parboiled rice are known in which the heating of the rice in the cooking process takes place by contacting it with a hot surface. The rice swollen by being soaked in unheated water is carried through shafts whose walls are heated up. In order to bring the rice to boiling temperature in this process, the passageway through the shafts must be either very long, which entails high investment cost and requires considerable space, and/or the cross-section of the shafts must be very small to improve the ratio of quantity of rice per unit of thermal energy, and/or the heat supply must take place with a very high inlet temperature. In the latter case, those grains of rice which are in immediate contact with the shaft wall are in danger of being heated more intensely than the grains being in the middle of the shaft so that no simultaneous treatment can take place. Furthermore, roasting effects and even scorchings of the grains of rice with a corresponding change in their flavour may be brought about.

SUMMARY OF THE INVENTION

It is an object of the invention to provide a method and an apparatus for hydro-thermical treatment of starchy products, in particular rice, in such a way as to reduce the expenditure in energy, to avoid expensive autoclaves which can be operated only by qualified personnel, and, notwithstanding, to produce a high quality product.

In order to attain this object, it is proposed first to bring the product to boiling temperature by supply of heat energy at atmospheric pressure and, after having reached said temperature, to maintain it at this temperature in a heat-retaining zone for a predetermined period.

By heating the product up to boiling temperature which is generally done at atmospheric pressure and, therefore, without the use of pressure vessels, it suffices to add solely an initial quantity of heat required for reaching this boiling temperature in order to initiate the cooking process without using pressure, which cooking process is then continued in the heat-retaining zone under the influence of the heat energy supplied at the start. Thus, such a process necessitates very little energy and can be continued continuously in a simple manner in avoidance of expensive equipment as it is required for multistage processes and for cooking purposes in pressure vessels.

The heat-retaining zone is naturally made up in such a manner as to reduce as far as possible the natural heat losses occurring in said heat-retaining zone. To maintain the boiling temperature in the heat-retaining zone, heat energy is supplied, if necessary, in the heat-retaining zone merely in order to compensate for the natural heat losses.

To bring the moistened product more quickly to boiling temperature, it can be preheated before up to a temperature between 50° C. and 75° C., preferably to approximately 65° C. In this way, that zone in which the product is brought to boiling temperature by supplying heat energy can be held small and the change of temperature takes place slowly and gently. For example, this preheating can be carried out by soaking the product in warm water.

In order for the drying to take place in a gentle manner as well, this is suitably carried out according to the invention in several steps.

An apparatus for carrying out the process, according to the invention, comprises a cooking installation for the moistened product, a drying installation, and, if desired, a cooking installation for the cooked product wherein said cooking installation is provided with a heat-retaining vessel being preferably heat-insulated, which holds the product that has been brought to boiling temperature for a certain predetermined time. In this heat-retaining zone the actual cooking process of the product which is first brought to boiling temperature takes place without substantial supply of heat energy, since only possible heat losses have to be compensated for.

For this purpose, the heat-retaining vessel is provided with a heating installation by means of which the natural heat losses may be compensated for during the residence time of the product which is brought to boiling temperature.

In order to hold the temperature in the heat-retaining vessel at a constant value, a temperature sensor may be arranged in the heat-retaining vessel according to a further characteristic of the invention, which temperature sensor regulates the heating installation via a control circuit for maintaining a preselected temperature.

According to a preferred embodiment of the invention, the heating installation comprises a plurality of tubings extending within the heat-retaining vessel in a direction across the direction of flow of the product, said tubings being flown through by a hot heat-affording medium, preferably steam. This arrangement ensures a uniform distribution of temperature over the entire cross section of passage of the heat-retaining vessel and has the additional advantage that the change of temperature by contact heat takes place more quickly.

The tubings are conveniently designed with an elongated cross-section in the direction of flow of the product, having an upper roof portion which tapers away and—joining the roof portion—a lower portion whose length in longitudinal direction of the tubular cross section is larger than that of the roof portion and whose extension perpendicular to the longitudinal direction of the tubular cross section converges slightly toward that end which is turned away from the roof portion. Such tubings have an advantageous fluidic profile, since the roof portion divides the flow of the passing grains of the product to be precooked and the lower, slightly converging portion prevents the danger of deposits along the tubular walls of the moist product which slightly gelatinizes on its surface.

The heat-retaining vessel may be composed of several modules according to the invention, with the tubings which are flown through by the hot heat-affording medium being arranged in each module parallel to one another but preferably running in a direction across the direction of those of adjacent modules. The design of the heat-retaining vessel as a plurality of suitably uniformly built modules enables a modular construction thereof and thus an adaption of the heat-retaining vessel to the specific requirements. The fact that the tubings are running parallel to each other in each module ensures easy supply and discharge of the heat-affording medium, since it is solely necessary in this case to let the tubings end in a common collector at the two walls of the module facing each other, for example in the form of a dome. Owing to the fact that by respective fitting of the modules the tubings in adjacent modules are running in crosswise directions, preferably at right angles to each other, an averaging of the distribution of temperature over the cross section of passage of the heat-retaining vessel takes place as well.

The drying installation is composed of—according to the invention—by a drying module, forming at least one part of it, which joins the last module of the heat-retaining vessel in the direction of flow of the product and which is flown through by drying air, preferably at right angles to the direction of flow of the product. Such a design has the advantage that the modular design of the heat-retaining module may be continued in the drying installation whose outer shaping is identical to that of the modules of the heat-retaining vessel, whereby the fabrication is simplified.

Only one predrying step takes place in this part of the drying installation, since it is more advantageous for a gentle treatment of the product to carry out the drying within at least two hours. It is therefore suitable to design the drying installation with at least one dryer which is separately arranged from the heat-retaining vessel and which is flown through by drying air in opposite direction to the flow of the product. Thereupon, the complete drying suitably takes place in this dryer.

To make sure that the product will be precooked in the required way on leaving the heat-retaining vessel, it is necessary for it to remain in the heat-retaining vessel for a predetermined time. To ensure this, according to a further characteristic of the invention, an installation for dosed discharge is provided at the discharge end of the heat-retaining vessel, or the drying module connected to the former, respectively, whereby the throughput capacity through the heat-retaining vessel can be regulated.

BRIEF DESCRIPTION OF THE DRAWINGS

In the drawings the invention is schematically illustrated by way of embodiments.

DETAILED DESCRIPTION OF THE DRAWINGS

Figure 1:
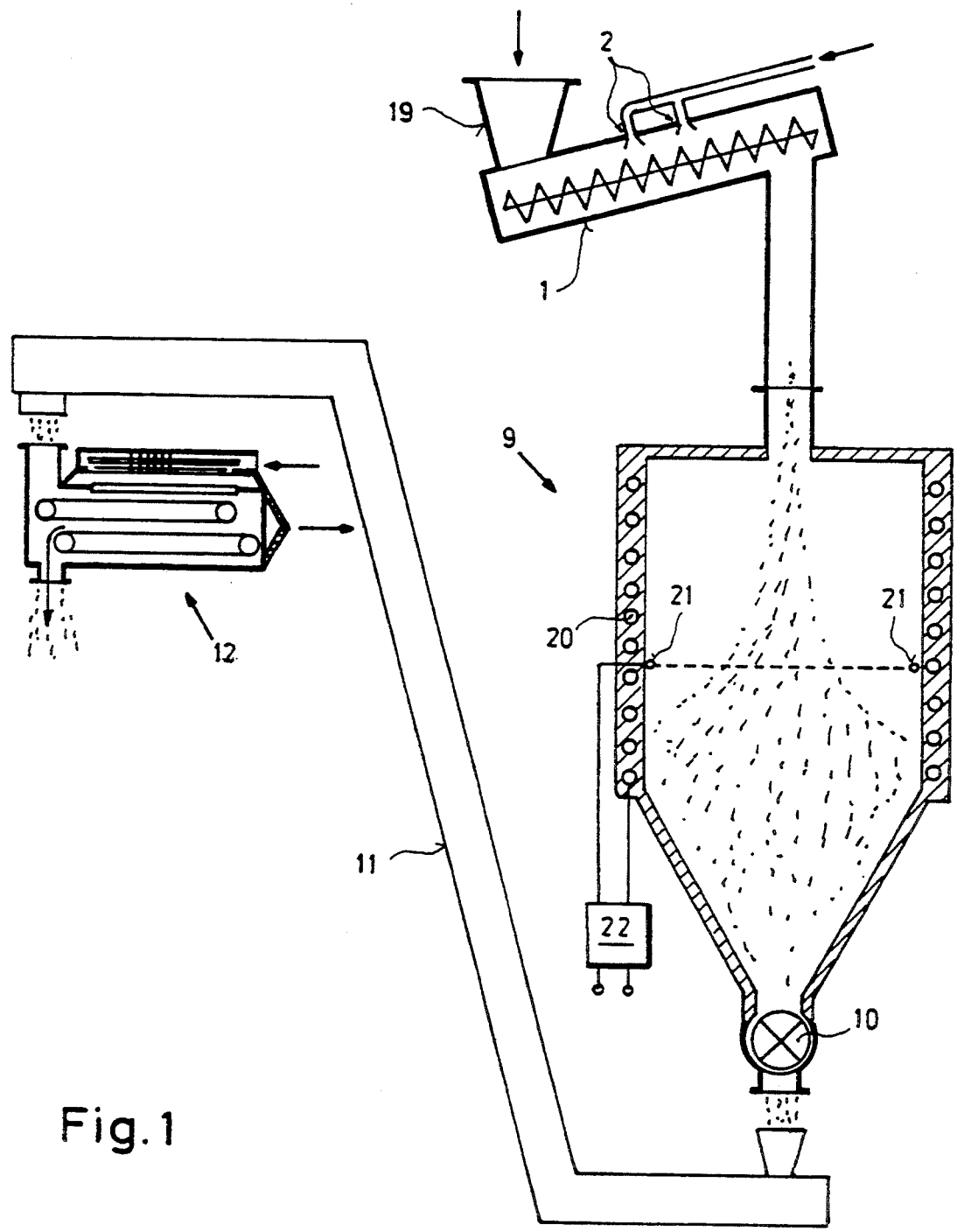
FIG. 1 shows a longitudinal section across a first embodiment of the apparatus according to the invention and FIG. 2 a second embodiment of the apparatus according to the invention, partly in a perspective view.

The apparatus shown in FIG. 1 comprises a screw conveyor 1 to which the rice to be precooked is supplied via a hopper 19. In the housing of the screw conveyor 1 are provided nozzles 2 for the supply of a fluid. Either already moistened rice is fed through the hopper 19 and hot steam is injected at a temperature of approximately 100° C. via the nozzles 2, whereby the liquid contained in the rice is brought to boiling temperature, or two or more of such screw conveyors 1 are arranged in series, in which case water, particularly hot water, is added in the first screw conveyor for moistening the rice via the nozzles 2, and the steam mentioned above is introduced in the last screw conveyor when seen in the direction of flow. By injecting this steam, the rice is brought to boiling temperature at atmospheric pressure, i.e., without the use of a pressure vessel.

After that, the moistened rice, having boiling temperature, passes to a heat-retaining vessel 9 which is designed silo-shaped in the embodiment according to FIG. 1 and is fitted with heat-insulated walls, with a heating installation 20 composed of heating worms being arranged in said heat-retaining vessel. In the heat-retaining vessel 9 are provided temperature sensors 21 by means of which the heating installation 20 is regulated via a control circuit 22 for maintenance of a preselected temperature. In this case, the heat supply takes place only in an amount determined by the reduction of temperature due to heat losses within the heat-retaining vessel. However, these are low owing to the heat-insulation.

The residence time of the rice in the heat-retaining vessel 9 is determined by the type of rice and the desired degree of gelatinization and amounts to approximately 10 to 40 minutes, in particular about 15 to 35 minutes. In the course of this time, the temperature of the rice will certainly drop somewhat, so that the particular arrangement of heating installation 20 proves advantageous.

However, from the low amount of heat which has to be supplied via the heating installation 20 appears how much energy can be saved during the relatively long residence time. Comparison measurements with traditional methods have shown that savings in the energy requirements of about 40% to 60% such could be achieved.

Once the actual precooking procedure in the heat-retaining vessel 9 is finished, the rice is carried out of the heat-retaining vessel 9 via an installation 10 for dosed discharge in the form of a rotary valve and is then fed to a dryer via an elevator 11. This dryer is planned as a belt dryer being known per se in the embodiment represented according to FIG. 1, but it can also consist of a tunnel tube dryer as it will be described in the following according to FIG. 2. In order to avoid quality losses, the drying procedure should take place in a gentle way. For this reason, it is convenient to carry out the drying procedure in several steps, that is, in the case in question several belt dryers 12 arranged in series are to be provided.

Figure 2:
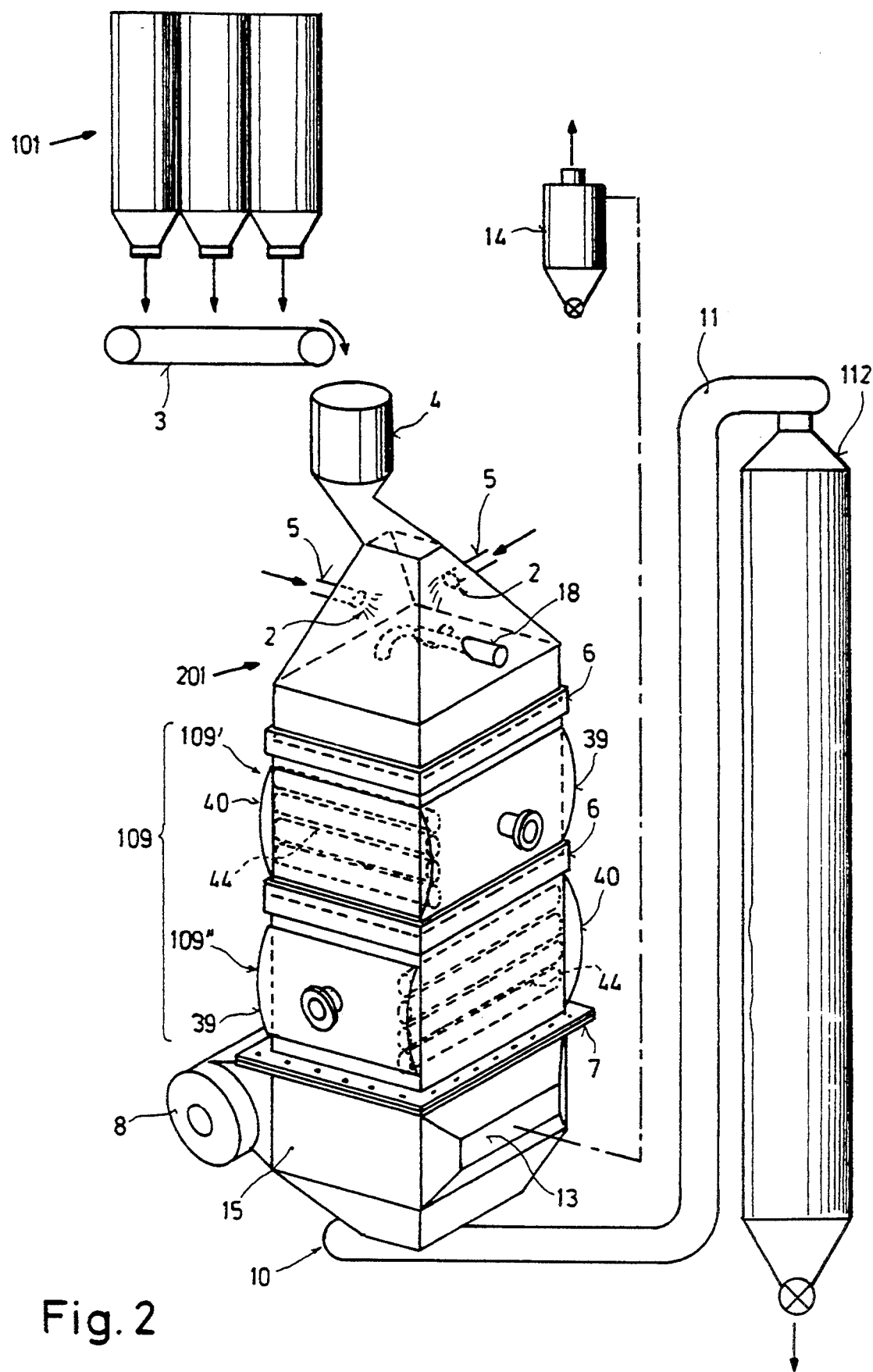

FIG. 2 represents a preferred embodiment according to the invention. For the rice to be moistened, it is first fed to at least one soaking vessel 101 which is designed as a feeder conduit (not shown) for water, as a feeder conduit for steam (not shown) and suitably also as a level sensor which is known per se. After filling the soaking vessel 101 with rice, water is introduced into it, and then the rice remains in the vessel until it has reached a moisture content of approximately 30% to 35%. If hot water is used, a preheating of the rice up to, for instance, 50° to 75° C. takes place simultaneously, if, however, fresh water is used, this preheating may be carried out by an ensuing supply of steam. The preheating of the rice in the soaking vessel 101 has the advantage that the actual heating zone 201 in which the rice is brought to boiling temperature may be held small and that the change of temperature takes place slowly and gently.

The long residence time of the rice in the soaking vessels 101 entails—in the case of quasi-continuous operation—an arrangement of several, but at least two, vessels of such a kind which can be emptied reciprocally. It may, of course, be of interest to provide one soaking vessel 101 each for different types of rice.

The rice, now having the necessary moisture content, then passes from a soaking vessel 101 via a belt conveyor 3 to a feed hopper 4 which may comprise a metering unit, so that a uniform supply of the rice will be ensured. Via the feed hopper 4, the rice is fed to the heating installation 201 mentioned above, in which the moistened rice is brought to boiling temperature. The hot steam is injected through nozzles 2 conveniently arranged which are linked to feeder conduits 5. According to the kind of steam, a corresponding increase in the moisture content will result, which increase will, in general, not be in excess of 5%, though. In practice, increases in moisture content in the order of about 1% to 3%, mostly approximately 2%, will be found.

For better mixing of the rice with the steam supplied, a mixing apparatus, or an agitator, respectively, will be provided, of which merely the stirring shaft is shown.

The heating unit 201 is arranged at the upper end of the heat-retaining vessel 109 into which the rice is fed after being brought to boiling temperature. This heat-retaining vessel 109 comprises at least two modules 109', 109" whose walls are suitably provided with an insulating casing. The residence time of the rice in this heat-retaining vessel amounts to at least 10 to 40 minutes, particularly between 15 and 35 minutes, so that with continuous, or quasi-continuous operation, respectively, it is necessary to design a greater number of modules, or to plan these longer than it is shown in the drawing. During this time, heat losses are occurring in spite of the heating insulation, which heat losses have to be compensated for. This can be done in the same way as described on the basis of the embodiment represented in FIG. 1. It is preferred, however, to provide tubings 44 within each of the modules 109', 109" arranged parallely to each other and in opposite direction to the direction of flow of the rice, through which tubings flows a heat-affording medium, preferably hot steam. The arrangement of these tubings 44 ensures a uniform distribution of temperature over the entire cross section of passage and a quick transition of heat by providing large contact surfaces.

The individual modules 109', 109" are designed with a corresponding dome 39, or 40, respectively, at the walls facing each other, in which domes the tubings 44 open out with their ends, so that via these domes the mutual supply, or discharge, respectively, of the heat-affording medium can be carried out. The details of this construction will be described in the following on the basis of FIG. 3.

As illustrated in the drawing, it is advantageous to design the module 109" in a position twisted by 90° to module 109', so that the tubings 44 of the one module cross the tubings 44 of the adjacent module under an angle of 90°. Also in this way, an averaging of the distribution of temperature over the cross section of passage can be achieved.

It is evidently also possible to provide in each of the modules tubings arranged crosswise, whereby, however, the supply and discharge lines are complicated. It is possible as well to design the tubings as latticed elements, but in doing so the tubings are more difficult to clean, and such an arrangement causes a marked narrowing down of the cross section of passage, so that the construction represented in the drawing will be preferred. The construction of the heat-retaining vessel as an apparatus being composed of individual modules allows to change the throughput capacity by choosing a corresponding number of modules and to adapt it to the given conditions. For the purpose of a uniform design of the individual modules, it is advantageous to plan these—if looked at in sectional view perpendicularly to the direction of flow of the rice—as square elements. The modules 109', 109" are provided at their upper end with a widened edge 6 into which the lower wall of the corresponding module positioned on top of it is placed, with an intermediate layer of an appropriate seal in between. This enables a simple connection of the individual adjacent modules. Of course, such a connection can also be accomplished in a common way via flanged joints 7, as shown on the bottom side of module 109".

The grains of rice discharged from the heat-retaining vessel 109 have to be subjected to a drying procedure. The drying suitably takes place in two steps, i.e. first in a predryer 15, which is linked directly to the lower side of module 109. This predryer is flown through across the direction of flow of the rice by drying air, which is supplied on one side via a blower 8 and drawn off on the other side via a hood 13. In order to remove possible dust particles or the like in the exhausted air, it is convenient to postpone a dust collector, preferably a cyclone 14.

The rice which has been predried in the predryer 15 then reaches, via an elevator 11, a dryer separately arranged from the heat-retaining vessel 109, which dryer may also be composed of modules 109', 109". An advantage of this design is to be found in the fact that these modules which may be used multiple times can be produced in great quantities and, therefore, at relatively low cost.

At the discharge end of the predryer 15, there is again arranged an installation 10 for dosed discharge whose throughput capacity determines the speed of passage across the heat-retaining vessel 109 and thus the residence time of the rice in retaining vessel 109 and thus the residence time of the rice in it. The throughput capacity, or the speed of this installation, respectively, may be designed conveniently as adjustable.

The dryer 112 is flown through by air from down below to the top in a direction opposite to the direction of flow of the rice, so that a complete drying of the rice will be ensured.

Figure 3:
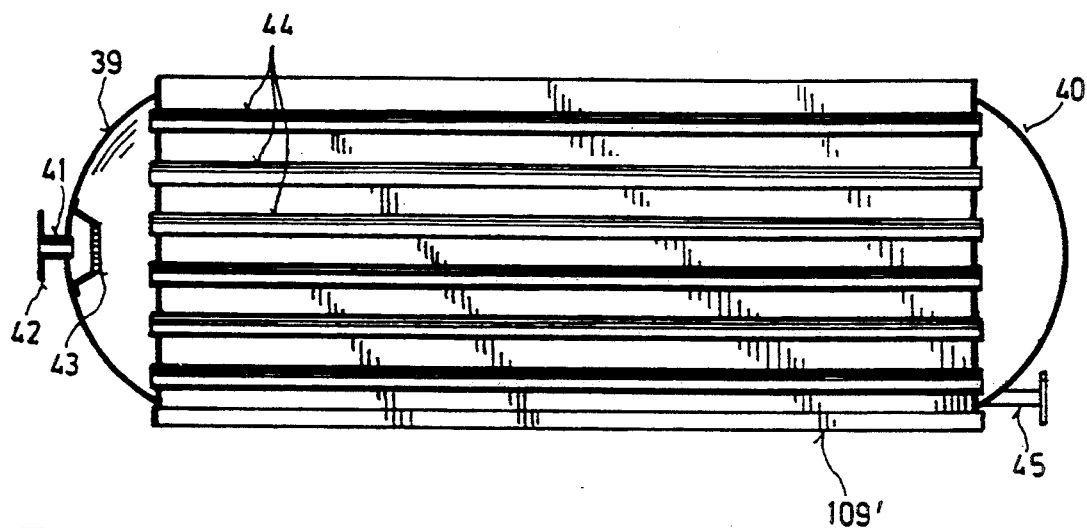
FIG. 3 depicts a section across an embodiment of one module of which the heat-retaining vessel is composed according to the embodiment in FIG. 2.

In FIG. 3 a module 109' is represented in detail. The dome 39 is connected to a supply tubing 41 which is provided with a flange joint 42. Within the dome, there is arranged a diffuser plate 43 in front of the mouth of the supply tubing 41 in order to distribute the supplied steam within the dome to the tubings 44 in a uniform fashion. These tubings 44 traverse the cross-section of the module 109' and, on the other side, end in the dome 40, which is provided with an exhaust spout 45 designed at the bottom end of the dome, by means of which the steam and also the condensation water is carried off. However, it is also possible to exclusively carry away the condensation water via this exhaust spout 45 and to provide for the steam a further exhaust unit in the upper area of the dome 40.

Such an arrangement is commonly used with grain dryers.

Figure 4:
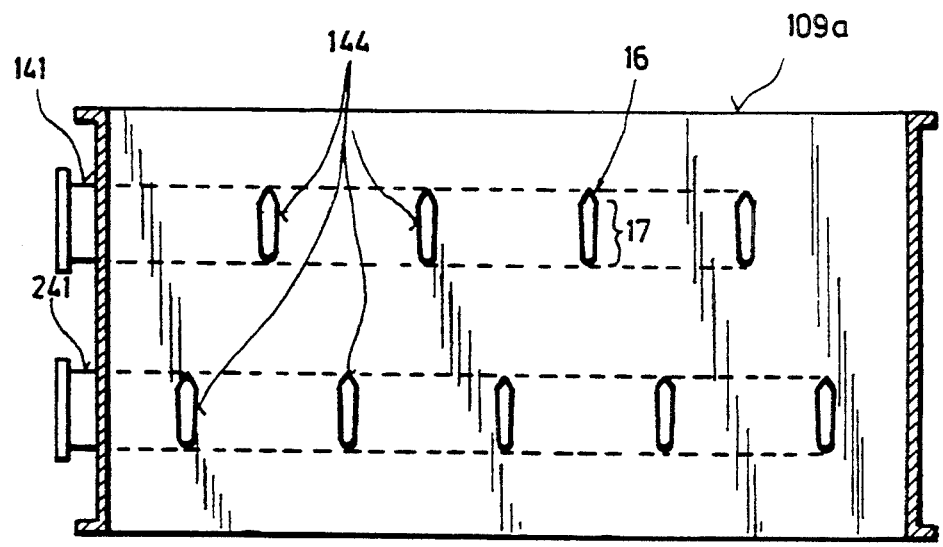
FIG. 4 shows a second embodiment of such a module, this time in the form of an illustration which is twisted by an angle of 90° to that in FIG. 3.

FIG. 4 shows an embodiment of a module 109a with peculiarly designed tubings 144, i.e., in a representation in which the cross-section of these tubings can be seen. The tubings 144 are arranged in two layers positioned on top of each other, with the tubings designed as being offset from one another in order to favor a uniform distribution of temperature.

The tubings of each layer are connected to a common supply pipe 141, or 241, respectively, running along the outside wall of the module, a corresponding exhaust pipe being located on the opposite side not shown in the drawing due to the transverse-sectional view. Also with this embodiment, the feeding of the tubings with steam is carried out simultaneously.

The tubings 144 have an elongated cross-section in the direction of flow of the rice. This consists of an upper roof portion 16 tapering away and being of a relatively small height, and a portion joining it below of greater height whose width converges slightly toward its lower end. The roof portion 16 divides the flow of the passing grains of rice by having an advantageous fluidic profile up to its greatest extension of width. To avoid as far as possible the danger of deposits of the moist rice which slowly gelatinizes on its surface along the outside wall of the tubings 144, the slightly converging portion 17 is made to join the roof portion, which converging portion 17, due to its design, causes a release of pressure, without a reduction of those surfaces affected by change of temperature occurring. Such a tubular cross-section may be produced also by bending of a metal sheet around the roof edge of portion 16 and by connection of the two end portions on the bottom side of the profile.

EXAMPLE

In an installation according to FIG. 2, after filling the soaking vessel 101 with so-called paddy rice, fresh water was introduced until reaching a predetermined level. Then this water was heated up by supply of steam of approximately 70°.

After a residence time of about three hours in the soaking vessel, the rice had reached a moisture content of approximately 30% to 35% and was carried onward to the heating installation 201 via the belt conveyor 3, whereupon the next vessel 101 was filled in the manner described above with rice and fresh water.

In the heating installation 201 the moist rice, having a moisture content of 32% to 37%, after being preheated to about 65° C., was brought to boiling temperature (100° C.) by the action of steam supplied via the nozzles 2. Thereupon, the rice passed to the heat-retaining vessel 109, where it remained for about 30 minutes. After that, the rice was brought down to a residual humidity of 30% and then dried and cooled by warm air added counter-currently in a vertical dryer 112 (with roof-like elements built in, below which dry air is flowing along), until it was taken from the dryer 113 and a postponed cooler, having a temperature of approximately 10° C. above outside temperature and a final moisture content of 15%. Then the rice was allowed to stand for several hours for conditioning purposes.

Within the scope of the invention, numerous modifications will be possible; for example, instead of using the vertical dryer mentioned before, an installation 201 for drying purposes could also be employed in order to favor manufacturing in series.

The invention is practiced advantageously with rice which has not yet been parboiled, namely, non-parboiled rice.

What is claimed is:

1. A method for hydro-thermally treating a starch containing product, wherein the product has a water content attained by absorption of water, the method comprising the steps of
    inserting the product into a heating element;
    supplying heat energy to the product via the heating element at atmospheric pressure until boiling temperature of the water content is attained, the product being moistened prior to said heat-supplying step in order to reach a predetermined content of said absorbed water in the starch product;
    inserting the product into a heat-retaining vessel;
    moving the product through the heat-retaining vessel via movement in a first direction;
    maintaining the boiling product within the heat-retaining vessel having a heat retaining zone so as to keep the product at an automatically controlled boiling temperature during a predetermined period, the maintaining being accomplished by flowing a heated medium in a second direction transverse to said first direction across a path of the movement of the product;
    inserting the product into a drying zone; and
    drying the product in the drying zone after completion of said maintaining step.

2. Method as claimed in claim 1, wherein heat energy is supplied by adding hot steam.

3. Method as claimed in claim 1, wherein heat energy is supplied to said heat retaining zone in an amount only for compensating natural heat losses.

4. Method as claimed in claim 1, further comprising a step of preheating the moist product up to a temperature between 50° C. and 75° C. before supplying heat energy to boiling temperature.

5. Method as claimed in claim 4, wherein said preheating step is effected up to a temperature of about 65° C.±5%.

6. Method as claimed in claim 1, wherein said drying step is effected in at least two steps.

7. Method as claimed in claim 1, further comprising the step of cooling the product after said heat retaining zone and said drying step.

8. Method as claimed in claim 1, wherein said starch containing product is rice.

9. A method according to claim 1, further comprising a step, prior to said heat-supplying step of
moistening the starch containing product, the product being in the form of numerous particles.

10. A method according to claim 9 further comprising
concurrently with said maintaining step, passing the particles through the heat-retaining vessel to prevent deposition of the particles within the vessel, said passing step including a step of establishing predetermined flow profile to the particles.

11. A method according to claim 9, wherein
said steam is at atmospheric pressure.

12. A method according to claim 11 further comprising
concurrently with said maintaining step, passing the particles through the heat-retaining vessel to prevent deposition of the particles within the vessel, said passing step including a step of establishing a predetermined flow profile to the particles.

13. A method for hydro-thermally treating a starch containing product, comprising the steps of
inserting the product into a soaking vessel;
moistening a starch containing product in the soaking vessel, the product being in the form of numerous particles or rice, the moistening being accomplished by soaking the product in water up to a predetermined moisture content in the starch;
preheating the product in the soaking vessel;
transferring the product from the vessel to a steamer;
supplying heat to the product in the steamer via steam, distant from said water, to raise the temperature of the product to boiling temperature;
inserting the product in a heat-retaining vessel having a heat-retaining and heat-loss compensating zone;
moving the product through the heat-retaining vessel via movement in a first direction;
maintaining the boiling product within the heat-retaining vessel so as to keep the product automatically at a controlled boiling temperature during a predetermined period, the maintaining being accomplished by flowing a heated medium in a second direction transverse to said first direction across a path of the movement of the product;
inserting the product into a drying zone; and
drying the product in the drying zone after completion of said maintaining step.

14. A method for hydrothermally treating a non-parboiled starch containing product, wherein the product has a water content attained by absorption of water, the method comprising the at least quasi-continuous process steps of:
inserting the product into a heating unit at atmospheric pressure;
supplying heat energy to the product in the heating unit at atmospheric pressure until boiling temperature of the product is attained, the product being moistened prior to said heat energy supplying step in order to reach a predetermined content of absorbed water in the starch product;
inserting the product into a heat-retaining vessel; moving the product through the heat-retaining vessel via movement in a first direction;
maintaining the boiling product within the heat-retaining vessel at atmospheric pressure so as to keep the product at an automatically controlled boiling temperature during a predetermined period, the maintaining being accomplished by flowing a heated medium in a second direction transverse to said first direction across a path of the movement of the product;
inserting the product into a drying zone; and
at least partially drying the product in the drying zone after completion of said maintaining step.

15. A method according to claim 14, further comprising the step of
heating the boiling product within the heat-retaining vessel merely by compensating for natural heat losses causing the starch to slowly gelatinize.

16. A method according to claim 15, further comprising the steps of:
supplying a limited amount of water to the product to heat the product during the heat energy supplying step; and
performing said further heating step without further addition of water.

17. A method according to claim 14, wherein
said predetermined period is approximately 10 to 40 minutes.

18. A method according to claim 14, wherein
said predetermined content of absorbed water is approximately 30% to 35%.

19. A method according to claim 14, wherein the supplying of heat energy is performed by applying hot steam.

* * * * *